(12) United States Patent
Shao et al.

(10) Patent No.: US 11,798,206 B2
(45) Date of Patent: Oct. 24, 2023

(54) METHOD FOR CLIPPING TWO-DIMENSIONAL (2D) POLYGON AGAINST RECTANGULAR VIEW WINDOW

(71) Applicant: CHINA UNIVERSITY OF PETROLEUM (EAST CHINA), Qingdao (CN)

(72) Inventors: Cairui Shao, Qingdao (CN); Ye Yuan, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/153,817

(22) Filed: Jan. 12, 2023

(65) Prior Publication Data

US 2023/0162414 A1    May 25, 2023

Related U.S. Application Data

(63) Continuation of application No. PCT/CN2021/110016, filed on Aug. 2, 2021.

(30) Foreign Application Priority Data

Feb. 23, 2021  (CN) .......................... 202110202322.4

(51) Int. Cl.
*G06T 11/20* (2006.01)
*G06T 11/40* (2006.01)

(52) U.S. Cl.
CPC ............ *G06T 11/203* (2013.01); *G06T 11/40* (2013.01); *G06T 2210/21* (2013.01)

(58) Field of Classification Search
CPC ... G06T 11/203; G06T 11/40; G06T 2210/21; G06T 2210/22; G06T 7/11; G06T 7/64;
(Continued)

(56) References Cited

U.S. PATENT DOCUMENTS 5,040,130 A    8/1991  Chang et al.

FOREIGN PATENT DOCUMENTS

CA    1328136 C       3/1994
CN    101923699 A    12/2010
(Continued)

OTHER PUBLICATIONS

Comninos, Peter. "Two-Dimensional Clipping." Mathematical and Computer Programming Techniques for Computer Graphics (2006): 193-223. (Year: 2006).*

(Continued)

*Primary Examiner* — Daniel F Hajnik

(57) ABSTRACT

A method for clipping a two-dimensional (2D) polygon against a rectangular view window, including inputting a vertex coordinate set A' of the 2D polygon and coordinates of the rectangular view window; creating a search circular linked list A and a vertex set B of an overlapping region; numbering vertices and edges of the 2D polygon and the rectangular view window; and storing vertices in the set A' into the list A; obtaining spatial relationship based on relative position between vertices of the 2D polygon and the rectangular view window; performing different operations according to the spatial relationship; adding the starting point $A_0$ in the list A to the vertex set B; allowing a pointer to point to the starting point $A_0$; determining whether a current vertex of the 2D polygon pointed by the pointer is within the rectangular view window; and clipping the 2D polygon.

9 Claims, 8 Drawing Sheets

(58) Field of Classification Search
CPC ...... G06T 2207/20132; G06T 2210/04; Y02D 10/00
See application file for complete search history.

(56) References Cited

FOREIGN PATENT DOCUMENTS

| | | |
|---|---|---|
| CN | 102360507 A | 2/2012 |
| CN | 102663716 A | 9/2012 |
| CN | 103034968 A | 4/2013 |
| CN | 104778024 A | 7/2015 |
| CN | 107103639 A | 8/2017 |
| CN | 109410213 A | 3/2019 |
| CN | 110989958 A | 4/2020 |
| CN | 112057854 A | 12/2020 |
| CN | 112837328 A | 5/2021 |

OTHER PUBLICATIONS

Foley et al., "Computer Graphics: Principles and Practice", Addison Wesley, 2nd ed. in C, 1996, ISBN 0-201-84840-6, p. 930. (Year: 1996).*
Yan-lin, Shao, et al. "The 3D modeling and visualization of geologic body based on GIS." 2010 International Conference on Audio, Language and Image Processing. IEEE, 2010. (Year: 2010).*
Shuangheng Feng et al., "A Polygon Clipping Algorithm Based on Series Coding Technique", IEEE, 2010, vol. 1, pp. 373-377.
Haijiao Li., "Algorithm for General Polygon Clipping and Its Applications in Civil Engineering", Engineering Science and Technology of Chinese Excellent Master's Thesis Full-text Database II.

* cited by examiner

METHOD FOR CLIPPING TWO-DIMENSIONAL (2D) POLYGON AGAINST RECTANGULAR VIEW WINDOW

CROSS-REFERENCE TO RELATED APPLICATIONS

This application is a continuation of International Patent Application No. PCT/CN2021/110016, filed on Aug. 2, 2021, which claims the benefit of priority from Chinese Patent Application No. 202110202322.4, filed on Feb. 23, 2021. The content of the aforementioned application, including any intervening amendments thereto, is incorporated herein by reference in its entirety.

TECHNICAL FIELD

This application relates to computer graphics, and more particularly to a method for clipping a two-dimensional (2D) polygon against a rectangular view window.

BACKGROUND

Polygon clipping algorithm has been extensively used in computer graphics and geographic information systems. As the basis for computer graphics, the polygon clipping algorithm is able to clip a target polygon (solid polygon) without leaving any residue. Regarding the polygon clipping, it is required to clip the polygon against the current window to obtain and fill an overlapped polygon, so as to reduce the time-space complexity of drawing and improve the drawing efficiency.

Chinese Patent Publication No. 103034968A discloses a method for clipping two-dimensional (2D) vector graphics, which is suitable for a 2D vector graphics hardware accelerator with masking function. This method includes: determining at least one clipping rectangle and converting each clipping rectangle into a vector graphics path corresponding to its boundary; storing the vector graphics path; setting a plurality of mask values corresponding to a display area, where the mask value of an area surrounded by the vector graphics path in the display area is set to be nonzero, and the mask value of the remaining area in the display area is set to be zero; enabling the masking function of the 2D vector graphics hardware accelerator, and subjecting an original image to frame buffering by using the mask values to produce a new image corresponding to the display area; and depicting the new image in the display area. Nevertheless, this method is only available for 2D vector graphics hardware accelerators with the masking function to solve the problems in the field of circuit clipping.

The prior art at least suffers from the following deficiencies.

When drawing arbitrarily complex convex-concave polygons by using the computer, these polygons tend to extend beyond the window area, resulting in drawing redundancy, increased spatial and temporal complexity, and reduced drawing efficiency.

SUMMARY

To solve the problem of low drawing efficiency in the prior art, this application provides a method for clipping a two-dimensional (2D) polygon against a rectangular view window. Specifically, the first internal point of the polygon is selected as the starting point, and points of the polygon are traversed one by one to analyze the spatial relationships between individual edges of the polygon and the boundary of the rectangular view window, so as to obtain the boundary points of the polygon within the rectangular view window, thereby clipping off invalid areas and reducing the drawing time and space complexity. The method provided herein is applicable to the clipping of arbitrary concave or convex polygons against the rectangular view window, and can be used in the geological, industrial and architectural drawing. Moreover, the method provided herein has improved spatial and temporal efficiency.

The technical solutions of the disclosure are described below.

In a first aspect, the disclosure provides a method for clipping a two-dimensional (2D) polygon against a rectangular view window, comprising:

(S1000) inputting a vertex coordinate data set A' of the 2D polygon and coordinate data of the rectangular view window;

(S2000) creating a search circular linked list A and a vertex set B of an overlapping region between the 2D polygon and the rectangular view window;

(S3000) numbering individual vertices and edges of the 2D polygon and individual vertices and edges of the rectangular view window; and storing vertices in the vertex coordinate data set A' into the search circular linked list A successively;

(S4000) obtaining a spatial relationship between the 2D polygon and the rectangular view window based on a relative position between individual vertices of the 2D polygon and the rectangular view window; wherein the spatial relationship is expressed by one of:

spatial relationship 1: the 2D polygon completely encompasses the rectangular window;

spatial relationship 2: the rectangular view window completely encompasses the 2D polygon;

spatial relationship 3: there is no intersection between the 2D polygon and the rectangular view window; and spatial relationship 4: there is an intersection between the 2D polygon and the rectangular view window, but the intersection is not the 2D polygon or the rectangular view window;

(S5000) if the spatial relationship between the 2D polygon and the rectangular view window is expressed by the spatial relationship 1, performing clipping according to the overlapping region between the 2D polygon and the rectangular view window and exiting a clipping program, wherein the overlapping region is the rectangular view window;

if the spatial relationship between the 2D polygon and the rectangular view window is expressed by the spatial relationship 2, performing clipping according to the overlapping region and exiting the clipping program, wherein the overlapping region is the 2D polygon;

if the spatial relationship between the 2D polygon and the rectangular view window is expressed by the spatial relationship 3, exiting the clipping program; and if the spatial relationship between the 2D polygon and the rectangular view window is expressed by the spatial relationship 4, taking a first vertex of the 2D polygon in the rectangular view window as a starting point $A_0$ of the search circular linked list A and renumbering the vertices of the 2D polygon; and proceeding to step (S6000); or finding a first edge of the 2D polygon having two intersection points with the rectangular view window; inserting a midpoint $M_0$ between the two intersection points into the search circular linked list A after a starting point of the first edge as a new starting point $A_0$ of the search circular linked list A, and renumbering the vertices of the 2D polygon; and proceeding to step (S6000);

(S6000) adding the starting point $A_0$ in the search circular linked list A to the vertex set B;

(S7000) allowing a pointer to point to the starting point $A_0$ in the search circular linked list A;

(S8000) determining whether a current vertex of the 2D polygon pointed by the pointer is within the rectangular view window;

if the current vertex is within the rectangular view window, adding the current vertex to the vertex set B;

if the current vertex is outside the rectangular view window, according to the number of intersection points between individual edges of the 2D polygon and the rectangular view window, determining points needed to be added to the vertex set B; and adding the points to the vertex set B; and if the current vertex is not a last vertex, allowing the pointer to point to a next vertex relative to the current vertex, and performing step (S8000); otherwise, proceeding to step (S9000);

wherein the points needed to be added to the vertex set B comprise several vertices of the 2D polygon, intersection points between the 2D polygon and the rectangular view window, several vertices of the rectangular view window, or a combination thereof; and (S9000) clipping the 2D polygon according to the vertex set B and exiting the clipping program.

In an embodiment, before the step (S6000), the method further comprises:

(S0001) determining individual edges of the 2D polygon as a vector edge;

(S0002) based on positions of starting and ending points of individual vector edges of the 2D polygon relative to the rectangular view window, determining an intersection point of individual vector edges with the rectangular view window as the out point or the in point;

wherein when a starting point of a vector edge is within the rectangular view window and an ending point of the vector edge is outside the rectangular view window, an intersection point of the vector edge with the rectangular view window is determined as the out point, and an edge of the rectangular view window where the out point is located is recorded as the edge OutLine; and when a starting point of a vector edge is outside the rectangular view window and an ending point of the vector edge is within the rectangular view window, an intersection point of the vector edge with the rectangular view window is determined as the in point, and an edge of the rectangular view window where the in point is located is recorded as the edge InLine.

In an embodiment, the step of "determining points needed to be added to the vertex set B according to the number of intersection points between individual edges of the 2D polygon and the rectangular view window; and adding the points to the vertex set B" comprises:

(S8100) adding an intersection point $P_1$ to the vertex set B, wherein the intersection point $P_1$ is an intersection point between an edge $A_iA_{i+1}$ and the rectangular view window; $A_{i+1}$ is a first point which is outside the rectangular view window, and $A_i$ is a previous point of $A_{i+1}$; and the intersection point $P_1$ is after the point $A_i$ in the vertex set B;

(S8200) successively selecting two adjacent points $A_{Fd1}$ and $A_{Fd2}$ from the search circular linked list A, wherein the points $A_{Fd1}$ and $A_{Fd2}$ are after the point $A_{i+1}$; and determining the number of intersection points between a segment $A_{Fd1}A_{Fd2}$ and the rectangular view window;

(S8210) if the segment $A_{Fd1}A_{Fd2}$ has no intersection points with the rectangular view window, returning to step (S8200) to select new points from subsequent points in the search circular linked list A for determination;

(S8220) if the segment $A_{Fd1}A_{Fd2}$ has two intersection points with the rectangular view window, adding a midpoint M between the two intersection points to the search circular linked list A; letting the point $A_{Fd2}$ be the midpoint M, such that the segment $A_{Fd1}A_{Fd2}$ has one intersection point $P_2$ with the rectangular view window; and proceeding to step (S8300); and (S8230) if the segment $A_{Fd1}A_{Fd2}$ has one intersection point $P_2$ with the rectangular view window, proceeding to step (S8300);

(S8300) constructing a temporary polygon OutPoly located outside the rectangular view window; with point $P_1$ as starting point and the point $P_2$ as ending point, adding vertices of the 2D polygon between the point $P_1$ and the point $P_2$ to the OutPoly in sequence;

(S8400) according to serial numbers of edges of the 2D polygon where an out point and an in point are respectively located, and coordinate information of vertices in the OutPoly, inserting several vertices of the rectangular view window at a tail of the vertex set B; and finally adding the point $P_2$;

(S8500) determining whether the point $A_{Fd2}$ is the starting point $A_0$;

if the point $A_{Fd2}$ is the starting point $A_0$, indicating completion of a traversal; and exiting the clipping program;

otherwise, returning to step (S8000) and continuing traversing subsequent vertices of the 2D polygon in the search circular linked list A.

In an embodiment, the vertices of the rectangular view window are inserted at the tail of the vertex set B through steps of:

(S8410) assuming that the point $P_1$ is an intersection point between the edge $A_iA_{i+1}$ and an edge OutLine of the rectangular view window, and the point $P_2$ is an intersection point between the segment $A_{Fd1}A_{Fd2}$ and an edge InLine of the rectangular view window, such that according to step (S8220), the point $P_1$ is the out point and the point $P_2$ is the in point, and the temporary polygon OutPoly is formed by points $P_1$, $A_{i+1}$, ..., $A_{Fd1}$, and $P_2$;

(S8420) determining whether individual vertices of the rectangular view window is within the temporary polygon OutPoly; and determining a relationship between an edge on which the out point $P_1$ is located and an edge on which the in point $P_2$ is located;

(S8430) determining the number of vertices of the rectangular view window needed to be added to the vertex set B based on the relationship between the edge on which the out point $P_1$ is located and the edge on which the in point $P_2$ is located;

(S8440) determining an order of adding the vertices of the rectangular view window needed to be added to the vertex set B based on an order of vertices of the rectangular view window passed by a path from the out point $P_1$ to the in point $P_2$ along four edges of the rectangular view window; and (S8450) inserting the vertices of the rectangular view window needed to be added to the vertex set B at the tail of the vertex set B according to the number of the vertices of the rectangular view window needed to be added to the vertex set B and the order of adding the vertices of the rectangular view window needed to be added to the vertex set B; and In an embodiment, in step (S8420), whether individual vertices of the rectangular view window are within the temporary polygon OutPoly is determined through steps of:

(S8421) inputting coordinate data of a vertex P of the rectangular view window and a coordinate point set C of vertices of the temporary polygon OutPoly;

(S8422) obtaining a rectangular region R according to the maximum and minimum values of horizontal and vertical coordinates in the coordinate point set C;

(S8423) determining whether the vertex P is within the rectangular region R;

if not, indicating that the vertex P is outside the temporary polygon OutPoly; and if yes, taking another point P' such that segment PP' is a horizontal segment, and a horizontal coordinate of the point P' is at least 1 greater than the maximum horizontal coordinate in the coordinate point set C; and proceeding to step (S8424);

(S8424) cyclically taking two adjacent points $C_i$ and $C_{i+1}$ in turn from a first point to a last point in the coordinate point set C, with an initial number of intersections being 0;

determining whether segment $C_iC_{i+1}$ and the segment PP' has an intersection point that is not point $C_i$ or whether there is an overlap between the segment $C_iC_{i+1}$ and the segment PP';

if so, increasing the number of intersections by one;

if not, taking next two adjacent points; and when taking the last two adjacent points, if the number of intersections is odd, the point P is within the temporary polygon OutPoly; and if the number of intersections is even, the point P is outside the temporary polygon OutPoly.

In an embodiment, step (S8430) comprises:

if the edge OutLine is opposite to the edge InLine, adding two vertices of the rectangular view window to the vertex set B;

if the edge OutLine is adjacent to the edge InLine, adding one or three vertices of the rectangular view window to the vertex set B; and if the edge OutLine and the edge InLine are the same edge, adding zero or four vertices of the rectangular view window to the vertex set B.

In an embodiment, step (S8440) comprises:

leading paths from the out point $P_1$ to the in point $P_2$ along four edges of the rectangular view window;

selecting the path comprising the vertices of the rectangular view window needed to be added to the vertex set B; and determining the order of adding the vertices according to the order in which the path passes through the vertices needed to be added to the vertex set B.

In an embodiment, the method further comprises:

filling in a vertex addition table of the rectangular view window with the serial numbers of edges where the out point and the in point are respectively located, a position relationship between the out point and the in point when they are on the same edge, a serial number of individual vertices of the rectangular view window in the temporary polygon OutPoly, and the vertices of the rectangular view window needed to be added to the vertex set B and the order of adding the vertices of the rectangular view window, for subsequent direct search and use.

In an embodiment, in step (S4000), the spatial relationship between the 2D polygon and the rectangular view window is obtained through steps of:

starting from the first vertex of the 2D polygon, successively determining whether individual vertices of the 2D polygon are within the rectangular view window;

if all vertices of the 2D polygon are within the rectangular view window, the spatial relation is the spatial relationship 2;

if a next vertex of a vertex is not within the rectangular view window, the spatial relationship is the spatial relationship 4; and if all vertices are not within the rectangular view window, determining whether there is an edge having two intersection points with the rectangular view window;

if yes, the spatial relationship is the spatial relationship 4; and if not, determining whether an upper-left vertex of the rectangular view window is within the 2D polygon;

if yes, the spatial relationship is the spatial relationship 1;

otherwise, the spatial relationship is the spatial relationship 3.

In a second aspect, this application provides a method for drawing petroleum geological primitives by using the aforementioned method, wherein the petroleum geological primitives comprise polygon-filling primitive data consisting of fold, fault, monocline, sharp extinction, and lithological fill.

This application at least has the following beneficial effects.

(1) In this application, the spatial relationship between each side of a polygon and the boundary of a rectangular view window is analyzed by selecting the first point of the polygon as the starting point and traversing the points of the polygon one by one to obtain the boundary points of the polygon within the rectangular, thereby clipping off invalid areas and reducing the drawing time and space complexity.

(2) The application designs a new algorithm for adding vertices of the rectangular view window, when the exit and entry points and the vertices of polygon passed by the in point to reach the out point are known. This algorithm applies to the vertex set of polygon stored in a search circular linked list. Moreover, in the case where any concave and convex polygon intersects with a rectangle, this algorithm is also applicable to accurately obtain the vertex set of the polygon in the overlapping region.

(3) This application provides an algorithm for determining whether the vertex of a rectangular view window is within a temporary polygon, which is applicable to determine whether an arbitrary point is within an arbitrary polygon. This algorithm also makes algorithmic optimization and fine consideration for the classical ray-drawing method. When determining whether the point P is outside a polygon, whether the point P is outside a circumscribed rectangle of the polygon is determined in advance, which can reduce unnecessary computational judgments. Moreover, a limited length line segment PP' is introduced instead of ray. Whether the line segment PP' has an intersection point with the line $C_iC_{i+1}$, which is composed of two points taken out in turn, is determined, with the intersection point not being $C_1$. In this case, the traditional counting algorithm is simplified when the ray passes through the vertices of the polygon, and thereby improving the time efficiency for determining whether a point is inside an arbitrary convex-concave polygon.

BRIEF DESCRIPTION OF THE DRAWINGS

in FIG. 5a an out point and an in point are on the same edge; in FIG. 5b, the out point and the in point are respectively on two adjacent edges; and in FIG. 5c, the out point and the in point are respectively on two opposite edges;

DETAILED DESCRIPTION OF EMBODIMENTS

Figure 1:
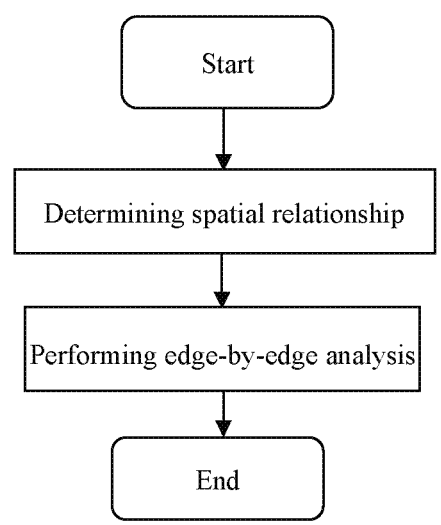
FIG. 1 is a flow chart of a method for clipping according to an embodiment of the present disclosure.
Figure 2:
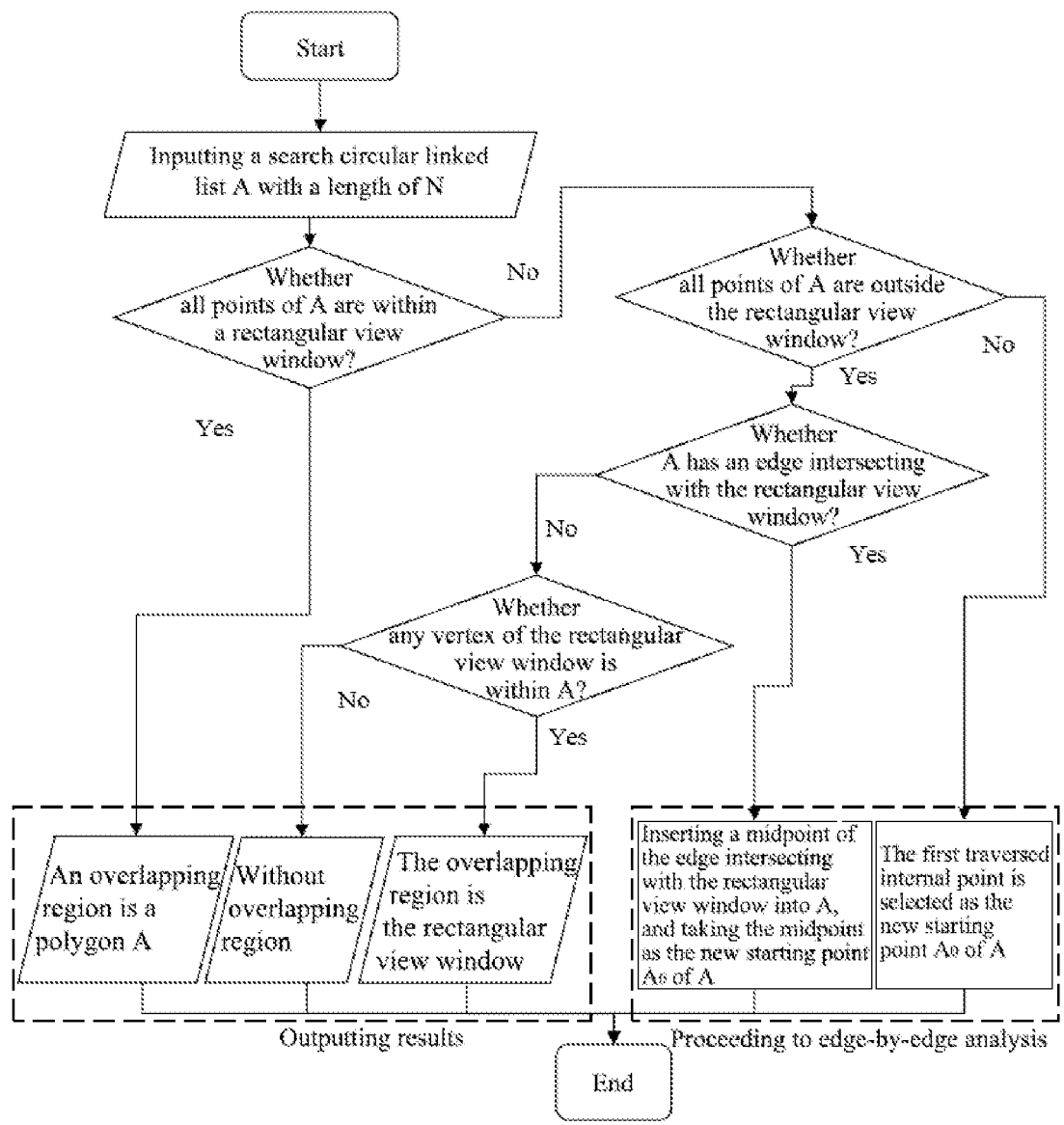
FIG. 2 is a flow chart of a spatial relationship determination step in the clipping method according to an embodiment of the present disclosure.
Figure 3:
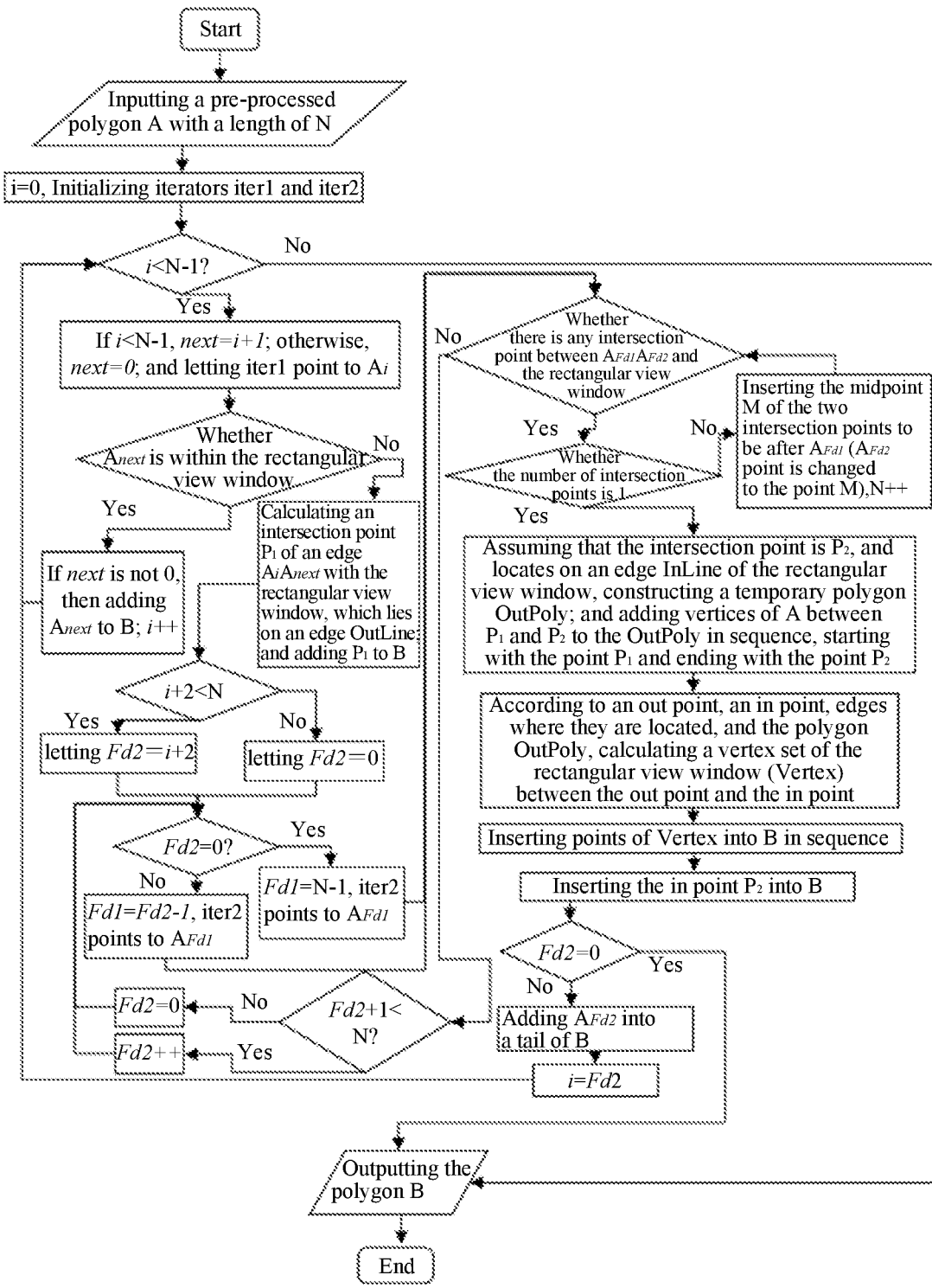
FIG. 3 is a flow chart of an edge-by-edge analysis step in the clipping method according to an embodiment of the present disclosure.
Figure 4:
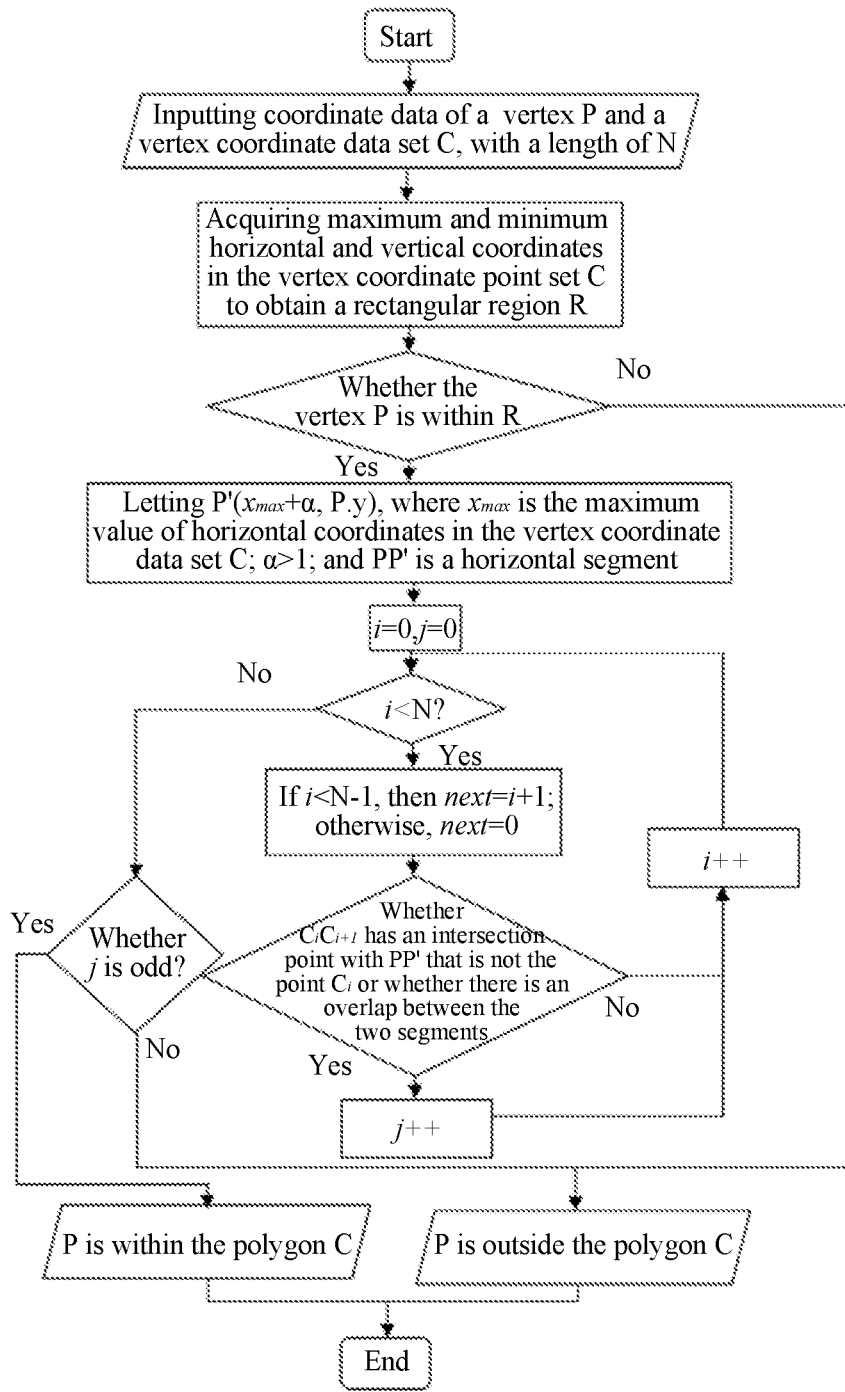
FIG. 4 is a flow chart for determining whether a vertex of a rectangular view window is within a temporary polygon according to an embodiment of the present disclosure.

The present application will be described in detail below with reference to the accompanying drawings.

Provided is a method for clipping a two-dimensional (2D) polygon against a rectangular view window, which includes the following steps.

Determination of a Spatial Relationship (S1000) A vertex coordinate data set A' of the 2D polygon and coordinate data of the rectangular view window are inputted.

(S2000) A search circular linked list A and a vertex coordinate data set B of an overlapping region between the 2D polygon and the rectangular view window are created.

(S3000) Individual vertices and edges of the 2D polygon and the rectangular view window are numbered. Vertices in the vertex coordinate data set A' are stored into the search circular linked list A successively.

(S4000) A spatial relationship between the 2D polygon and the rectangular view window is acquired based on a relative position between individual vertices of the 2D polygon and the rectangular view window, where the spatial relationship the spatial relationship is expressed by one of:
spatial relationship 1: the 2D polygon completely encompasses the rectangular window;
spatial relationship 2: the rectangular view window completely encompasses the 2D polygon;
spatial relationship 3: there is no intersection between the 2D polygon and the rectangular view window; and spatial relationship 4: there is an intersection between the 2D polygon and the rectangular view window, but the intersection is not the 2D polygon or the rectangular view window.

(S5000) If the spatial relationship between the 2D polygon and the rectangular view window is expressed by the spatial relationship 1, then the overlapping region is the rectangular view window, the clipping is performed according to the overlapping region between the 2D polygon and the rectangular view window, and exit a clipping program;
  if the spatial relationship between the 2D polygon and the rectangular view window is expressed by the spatial relationship 2, then the overlapping region is the 2D polygon, the clipping is performed according to the overlapping region, and then exit the clipping program;
  if the spatial relationship between the 2D polygon and the rectangular view window is expressed by the spatial relationship 3, then exit the clipping program;
  if the spatial relationship between the 2D polygon and the rectangular view window is expressed by the spatial relationship 4, then a first vertex of the 2D polygon in the rectangular view window is taken as a starting point $A_0$ of the search circular linked list A, vertices of the 2D polygon are renumbered, and an edge-by edge analysis is performed; or
  if a first edge of 2D polygon having two intersection points with the rectangular view window is found, a midpoint $M_0$ between the two intersection points is inserted into the search circular linked list A after a starting point of the first edge as a new starting point $A_0$ of the search circular linked list A, the vertices of the 2D polygon was renumbered, and proceed to step (S6000).

Edge-by Edge Analysis (S6000) The starting point $A_0$ in the search circular linked list A is added to the vertex set B.

(S7000) A pointer is allowed to point to the starting point $A_0$ in the search circular linked list A;

(S8000) Whether a current vertex of the 2D polygon pointed by the pointer is within the rectangular view window is determined:
  if the current vertex is within the rectangular view window, the current vertex is added to the vertex set B;
  if the current vertex is outside the rectangular view window, points needed to be added to the vertex set B are determined, based on the number of intersection points between individual edges of the 2D polygon and the rectangular view window; and the points are added to the vertex set B; and
  if the current vertex is not a last vertex, the pointer is allowed to point to a next vertex relative to the current vertex, and then step (S8000) is performed; otherwise, proceed to step (S9000);
  where the points needed to be added to the vertex set B include several vertices of the 2D polygon, intersection points between the 2D polygon and the rectangular view window, several vertices of the rectangular view window, or a combination thereof.

(S9000) The 2D polygon is clipped according to the vertex set B, and then exit the clipping program.

In an embodiment, before the step (S6000), the method further includes the following steps.

(S0001) Individual edges of the 2D polygon are determined as a vector edge;

(S0002) An intersection point of individual vector edges with the rectangular view window is determined as the out point or the in point, based on positions of starting and ending points of individual vector edges of the 2D polygon relative to the rectangular view window. The edges where the intersection point located is denoted as the edge OutLine or the edge InLine;

where when a starting point of a vector edge is within the rectangular view window and an ending point of the vector edge is outside the rectangular view window, an intersection point of the vector edge with the rectangular view window is determined as the out point; and when a starting point of a vector edge is outside the rectangular view window and an ending point of the vector edge is within the rectangular view window, an intersection point of the vector edge with the rectangular view window is determined as the in point.

In an embodiment, step of "points needed to be added to the vertex set B are determined based on the number of intersection points between individual edges of the 2D polygon and the rectangular view window" is performed through the following steps.

(S8100) An intersection point $P_1$ is added to the vertex set B, where the intersection point $P_1$ is an intersection point between an edge $A_iA_{i+1}$ and the rectangular view window; $A_{i+1}$ is a first point which is outside the rectangular view window, and $A_i$ is a previous point of $A_{i+1}$; and the intersection point $P_1$ is after the point $A_i$ in the vertex set B.

(S8200) Two adjacent points $A_{Fd1}$ and $A_{Fd2}$ are successively selected from the search circular linked list A, where the points $A_{Fd1}$ and $A_{Fd2}$ are after the point $A_{i+1}$. The number of intersection points between a segment $A_{Fd1}A_{Fd2}$ and the rectangular view window is determined:

(S8210) if the segment $A_{Fd1}A_{Fd2}$ has no intersection points with the rectangular view window, then return to step (S8200) to select new points from subsequent points in the search circular linked list A for determination;

(S8220) if the segment $A_{Fd1}A_{Fd2}$ has two intersection points with the rectangular view window, a midpoint M between the two intersection points is added to the search circular linked list A. The point $A_{Fd2}$ is allowed to be the midpoint M, such that the segment $A_{Fd1}A_{Fd2}$ has one intersection point $P_2$ with the rectangular view window, and step (S8300) is performed; and (S8230) if the segment $A_{Fd1}A_{Fd2}$ has one intersection point $P_2$ with the rectangular view window, then step (S8300) is performed.

(S8300) A temporary polygon outPoly located outside the rectangular view window is constructed. Vertices of the 2D polygon between a point $P_1$ and the point $P_2$ are added to the outPoly in sequence, with the point $P_1$ as starting point and the point $P_2$ as ending point.

(S8400) Several vertices of the rectangular view window are inserted at a tail of the vertex set B, according to serial numbers of edges of the 2D polygon where an out point and an in point are respectively located, and coordinate information of vertices in the OutPoly, and the point $P_2$ is finally added.

(S8500) Whether the point $A_{Fd2}$ is the starting point $A_0$ is determined:

if the point $A_{Fd2}$ is the starting point $A_0$, it indicates completion of a traversal; and exit the clipping program; and otherwise, return to step (S8000) to continuously traverse for subsequent vertices of the 2D polygon in the search circular linked list A.

In an embodiment, the vertices of the rectangular view window are inserted at the tail of the vertex set B through the following steps.

(S8410) The point $P_1$ is assumed to be an intersection point between the edge $A_iA_{i+1}$ and an edge OutLine of the rectangular view window, and the point $P_2$ is an intersection point between the segment $A_{Fd1}A_{Fd2}$ and an edge InLine of the rectangular view window. According to step (S8220), the point $P_1$ is the out point and point $P_2$ is the in point, and the temporary polygon OutPoly is formed by points $P_1, A_{i+1}, \ldots, A_{Fd1}$, and $P_2$.

(S8420) Whether individual vertices of the rectangular view window are within the temporary polygon OutPoly is determined, and the relationship between an edge on which the out point $P_1$ and the in point $P_2$ are respectively located is determined.

(S8430) The number of vertices of the rectangular view window needed to be added to the vertex set B is determined based on the relationship between the edge on which the out point $P_1$ is located and the edge on which the in point $P_2$ is located;

(S8440) An order of adding the vertices of the rectangular view window needed to be added to the vertex set B is determined based on an order of vertices of the rectangular view window passed by a path from the out point $P_1$ to the in point $P_2$ along four edges of the rectangular view window.

(S8450) The vertices of the rectangular view window needed to be added to the vertex set B are inserted at the tail of the vertex set B, according to the number of the vertices of the rectangular view window needed to be added to the vertex set B and the order of adding the vertices of the rectangular view window needed to be added to the vertex set B.

In an embodiment, in step (S8420), whether individual vertices of the rectangular view window are within the temporary polygon OutPoly is determined through the following steps.

(S8421) Coordinate data of a vertex P of the rectangular view window and a vertex coordinate point set C of vertices of the temporary polygon OutPoly are inputted.

(S8422) A rectangular region R is obtained according to the maximum and minimum values of horizontal and vertical coordinates in the coordinate point set C.

(S8423) Whether the vertex P is within the rectangular region R is determined:

if not, the vertex P is outside the temporary polygon OutPoly; and if yes, another point P' is taken such that segment PP' is a horizontal segment, and a difference between a horizontal coordinate of the point P' and the maximum horizontal coordinate in the coordinate point set C is greater than 1. Step (S8424) is then performed.

(S8424) Two adjacent points $C_i$ and $C_{i+1}$ are cyclically taken in turn, from a first point to a last point in the vertex coordinate point set C, with an initial count number of intersections being 0.

Whether a segment $C_iC_{i+1}$ and the segment PP' has an intersection point that is not the point $C_i$ or whether there is an overlap between the segment $C_iC_{i+1}$ and the segment PP':

if so, the count number of intersections is increased by one;

if not, a next point is taken; and when taking the final segment formed by last two adjacent points, if the count number of intersections is odd, the point P is within the temporary polygon OutPoly; and if the count number of intersections is even, the point P is outside the temporary polygon OutPoly.

In an embodiment, step (S8430) further includes the following steps:
- if the edge OutLine is opposite to the edge InLine, two vertices of the rectangular view window are added to the vertex set B;
- if the edge OutLine is adjacent to the edge InLine, one ore three vertices of the rectangular view window are added to the vertex set B; and
- if the edge OutLine and the edge InLine are the same edge, zero or four vertices of the rectangular view window are added to the vertex set B.

In an embodiment, step (S8440) further includes the following steps. Paths from the out point $P_1$ to the in point $P_2$ along four edges of the rectangular view window are introduced. The path including the vertices of the rectangular view window needed to be added to the vertex set B is selected. The order of adding the vertices needed to be added to the vertex set B is determined according to the order in which the path passes through the to-be-added vertices.

In an embodiment, the method further includes the following steps. The serial numbers of edges where the out point and the in point are respectively located, a position relationship between the out point and the in point when they are on the same edge, a serial number of individual vertices of the rectangular view window in the temporary polygon OutPoly, and the vertices of the rectangular view window needed to be added to the vertex set B and the order of adding the vertices of the rectangular view window are filled into a vertex addition table of the rectangular view window for subsequent direct search and use.

In an embodiment, in step (S4000), the spatial relationship between the 2D polygon and the rectangular view window is obtained through the following steps.

Whether each vertex is within the rectangular view window is successively determined starting from the first vertex of the 2D polygon:
- if all vertices of the 2D polygon are within the rectangular view window, the spatial relation is the spatial relationship 2;
- if a next vertex of a vertex is not within the rectangular view window, the spatial relationship is the spatial relationship 4, exit the searching; and
- if all vertices are not within the rectangular view window, determining whether there is an edge having two intersection points with the rectangular view window;
- if yes, the spatial relationship is the spatial relationship 4; and
- if not, determining whether an upper-left vertex of the rectangular view window is within the 2D polygon;
  - if yes, the spatial relationship is the spatial relationship 1;
  - otherwise, the spatial relationship is the spatial relationship 3.

This application also provides a method for drawing petroleum geological primitives by using the aforementioned method. The petroleum geological primitives include polygon-filled primitive data consisting of fold, fault, monocline, sharp extinction, and lithological fill.

Embodiment 1

The method of numbering the vertices and edges of the 2D polygon and rectangular view window is described in detail below.

For the rectangular view window, the top edge is denoted as edge 1, the right edge is denoted as edge 2, the bottom edge is denoted as edge 3, the left edge is denoted as edge 4; and the top-left vertex is denoted as vertex 1, the top-right vertex is denoted as vertex 2, the bottom-right vertex is denoted as vertex 3, and the bottom-left vertex is denoted as vertex 4.

Embodiment 2

The determination of the spatial relationship in this application is described in detail below.

A search circular linked list is denoted as A. A vertex set of an overlapping region is denoted as B. A rectangular view window is denoted as R.

The spatial relationship is determined through the following steps.

All points in the search circular linked list A are traversed, starting from the first element $A_0$, to determine whether $A_i$ (i=0, 1, 2 . . . N−1) is within the rectangular view window R.

An iterator is defined as iter0. If $A_i$ lies inside the rectangular view window R, the iterator iter0 is allowed to point to the next vertex $A_{i+1}$ in the search circular linked list A;
- where if all points of A are inside R, then B=A, and the algorithm ends;
- if some of the points of A are inside R while some are outside R, then the vertex currently pointed to by iter0 is allowed to be the first element $A_0$ of the search circular linked list A, and the pre-analysis ends and the edge-by-edge analysis is started; and
- if all points of A are outside R, then starting from the first edge $A_0A_i$ of the polygon, whether $A_iA_j$ intersects with the four edges of R is determined:
- if there are two intersection points, the midpoint M of the two intersection points is inserted after point $A_i$, N=N+1. Then point namely, point M, is allowed to be the first element $A_0$ of A, and the pre-analysis ends and the edge-by-edge analysis is started; and
- if there is no edge of the polygon has two intersection points with the four edges of R, determining whether any vertex of R is within A; if yes, B=R, and the algorithm ends; otherwise, B is empty, and the algorithm ends.

Embodiment 3

The edge-by-edge analysis is performed through the following steps.

(1) Integer variables i, Fd1, and Fd2 are defined. Letting i=0, and an iterator iter1 points to $A_0$, and $A_0$ is added to the end of B.

(2) If i<N−1, proceed to step (3); otherwise, proceed to step (13).

(3) Allowing the iterator iter1 to point to $A_i$. At this point, $A_i$ is inside R. The next point of $A_i$ is defined as $A_{next}$. If i<N−1, then $A_{next}$ is $A_{i+1}$; if i=N−1, it indicates that the current point is the last one, and its next point is defined as the starting point, namely, $A_{next}$ is $A_0$.

(4) If $A_{next}$ is inside R, $A_{next}$ is added to the end of B, i=i+1, and returning step (2); otherwise, proceed to step (5).

(5) If $A_i$ is inside R while $A_{next}$ is outside R, then there is an intersection point $P_1$ between the segment $A_iA_{next}$ and R, which lies on an edge OutLine of R, and then $P_1$ is added to the end of B.

(6) If i+2<N, then Fd2=i+2; otherwise, Fd2=0.
(7) Fd1 is the subscript of the previous point of $A_{Fd2}$, if Fd2=0, Fd1=N−1; otherwise, Fd1=Fd2−1.
(8) Allowing an iterator iter2 to point to $A_{Fd1}$. If the segment $A_{Fd1}A_{Fd2}$ has no intersection point with R, then proceed to step (9); if there is one intersection point, then proceed to step (10); and if there are two intersection points, then proceed to step (11).
(9) An in point is further searched, and whether Fd2<N−1 is determined: if yes, then Fd2=Fd2+1; otherwise, Fd2=0, then return to step (7).
(10) At this point, $A_{Fd2}$ is inside R. The intersection point between the segment $A_{Fd1}A_{Fd2}$ and R is defined as $P_2$, which is the in point and located on an edge InLine of R. A new polygon OutPoly is constructed. The data structure of the vertices is defined as an array, with the out point $P_1$ as the starting point. Then points $A_{i+1}$, $A_{i+2}$, ..., and $A_{Fd1}$ are successively added after $P_1$, followed by the addition of the in point $P_2$. The vertices of R to be added to the end of B and the adding order thereof are determined according to the point coordinates of the polygon OutPoly and serial numbers of the edge OutLine and the edge InLine where $P_1$ and $P_2$ are respectively located. The algorithm for adding the vertices of R will be described later. After the addition of the vertices of R, $P_2$ is inserted into the end of B, and proceed to step (12).
(11) At this point, $A_{Fd2}$ is outside R. The midpoint M of the two intersection points between the segment $A_{Fd1}A_{Fd2}$ and R is added after $A_{Fd1}$ of the original A. After that, the total number N of vertices of the polygon is redefined as N+1, and returning step (8) (Noted: in this case, the point $A_{Fd2}$ becomes the point M).
(12) If Fd2 is not 0, it indicates that not all vertices have been traversed yet. In this case, letting i=Fd2, the iterator iter1 points to $A_i$, and $A_i$ is added to the end of B, and returning step (2); otherwise, proceed to step (13).
(13) B is outputted, and the edge-by-edge analysis ends.

Embodiment 4

In this embodiment, how to determine whether a vertex P of the rectangular view window is within the temporary polygon is specifically described.

The point set of a temporary polygon is inputted as C, and a certain vertex P of the rectangular view window is within C is determined through the following steps.
(1) All points of C are traversed to obtain the maximum and minimum values of horizontal and vertical coordinates, denoted as $x_{max}$, $y_{max}$, $x_{min}$, and $y_{min}$, respectively. The four parameters together form a rectangular region R, where the coordinates of the upper-left corner and the lower-right corner are ($x_{min}$, $y_{min}$) and ($x_{max}$, $y_{max}$), respectively.
(2) Whether P is inside the rectangular region R is determined, that is, whether $x_{min} \leq x \leq x_{max}$ and $y_{min} \leq y \leq y_{max}$ are both satisfied, if yes, proceed to step (3); otherwise, it outputs that P is outside C, and the procedure is ended.
(3) A horizontal line segment extending to the right is drawn, with point P as the left endpoint. The right endpoint is set as P'($x_{max}$+α, Y), where α is an integer greater than or equal to 1, and Y is the same as the vertical coordinate of point P. Since the horizontal coordinate of P' is greater than the horizontal coordinates of all points of C, a half-line can be simulated. (Noted: since the point coordinates are integers, the intersection point coordinates need to be rounded to integers after the calculation of the intersection point between PP' and edges of polygon C. While there will be an error of no more than 0.5 between the real intersection point coordinates and the output intersection point coordinates, therefore, α≥1 is required herein to avoid errors produced during the calculation of the intersection point.)
(4) The integer variable j is used to represent the number of intersection points between PP' and the edges of polygon C, and the initial value of j is set to be 0.
(5) All the edges of C are traversed. The intersection point of PP' with the current edge of C is calculated, if there is an intersection point and the intersection point is not the starting point of the current edge of C, or if PP' is parallel to and partly coincided with the current edge of C, then j=j+1. Noted: since the intersection point between PP' and an edge of C is exactly at the end point (point H) of that edge, PP' has an intersection point with the previous or next edge of that edge being the point H, resulting in the repeat calculation of the intersection point. Therefore, the intersection point is required to be not the starting point of the current edge of C. In addition, if there is an overlapping area between PP' and the current edge, it is recorded as having an intersection point.
6) If the total number of intersection points j is odd, then it outputs that P is inside the polygon C; otherwise, it outputs that P is outside the polygon C.

Embodiment 5

Figure 5A:
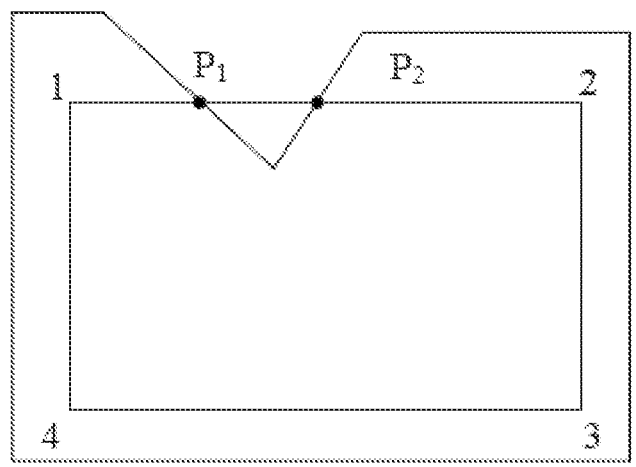
FIGS. 5a-5c are schematic diagrams for adding vertices of the rectangular view window to an end of an overlapping region vertex set B, where.
Figure 5B:
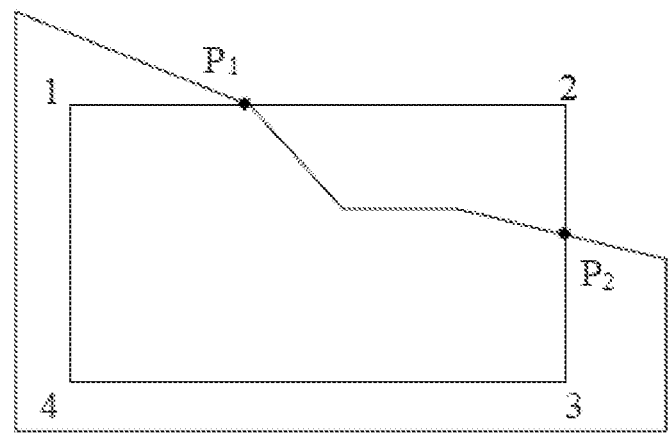
Figure 5C:
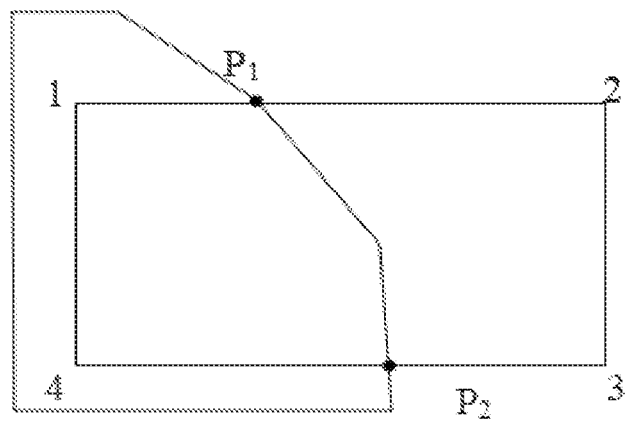

FIGS. 5a, 5b and 5c show three specific cases of the vertex addition algorithm. The principle of the algorithm for adding vertices of the rectangular view window into overlapping region point set B is described below.

The relative position between the out point and the in point includes: the two points lie on the same edge; the two points respectively lie on two adjacent edges; and the two points respectively lie on two opposite edges.
(1) If the in point and the out point are located on the same edge, zero or four vertices of the rectangular view window are added to the vertex set B. Whether any vertex Q of the rectangular view window is within the polygon OutPoly is determined, if yes, then four vertices are added to the vertex set B. The order (clockwise or counterclockwise) of adding the vertices and the first vertex to start adding are determined according to the relative position between the in and out points. For example, as shown in FIG. 5a, if the out point is $P_1$ and the in point is $P_2$, the order of adding the vertices is 1-4-3-2; if the out point is $P_2$ and the in point is $P_1$, the order of adding the vertices is 2-3-4-1. The rule is similar when the out point and the in point are both on other edges. If the vertex Q is outside the OutPoly, then zero vertices of the rectangular view window is added to the vertex set B.
(2) If the in point and the out point are respectively located on two adjacent edges of the rectangular view window, one or three vertices of the rectangular view window are added to the vertex set B. Whether the intersection point M of the two adjacent edges is within the polygon OutPoly is determined, if yes, then the point M is added to the vertex set B; otherwise, other three vertices except for the point M are added to the vertex set B. The order of adding the vertices and the first vertex to start adding are determined according to the relative position between the in and out points. For example, as shown in FIG. 5b, if the out point is $P_1$ and the in point is $P_2$, the order of adding the vertices is 1-4-3; if the out point is $P_2$ and the in point is $P_1$, the order of adding the vertices is 3-4-1. This rule is similar when the out point and the in point are located on other edges.

(3) If the in point and the out point are respectively located on two opposite edges of the rectangular view window, two vertices of the rectangular view window are added to the vertex set B, and the serial number and order of adding the vertices are determined. As shown in FIG. 5c, the vertices needed to be added to the vertex set B are vertices 2, 3 or 1, 4, according to the position of the in and out points. Specifically, whether an arbitrary point is within the polygon C is determined to acquire the vertices needed to be added to the vertex set B. In this case, the endpoint 1 is within the polygon, so the vertices needed to be added to the vertex set B are vertices 1 and 4. Once the vertices needed to be added to the vertex set B have been determined, the order of adding the vertices is then determined by the relative relationship between the out and in points. In FIG. 5c, if $P_1$ is the out point and $P_2$ is the in point, then the order of adding the vertices is 1-4; otherwise, the order of adding the vertices is 4-1. The rule is similar for other cases.

Embodiment 6

In this embodiment, an adding rule for the vertices of the rectangular view window is provided, which considers various relative relationship between the out and in points, as shown in Table 1.

Embodiment 7

In this embodiment, the clipping method provided herein is described in detail below with reference to FIGS. 6a-6d.

Figure 6A:
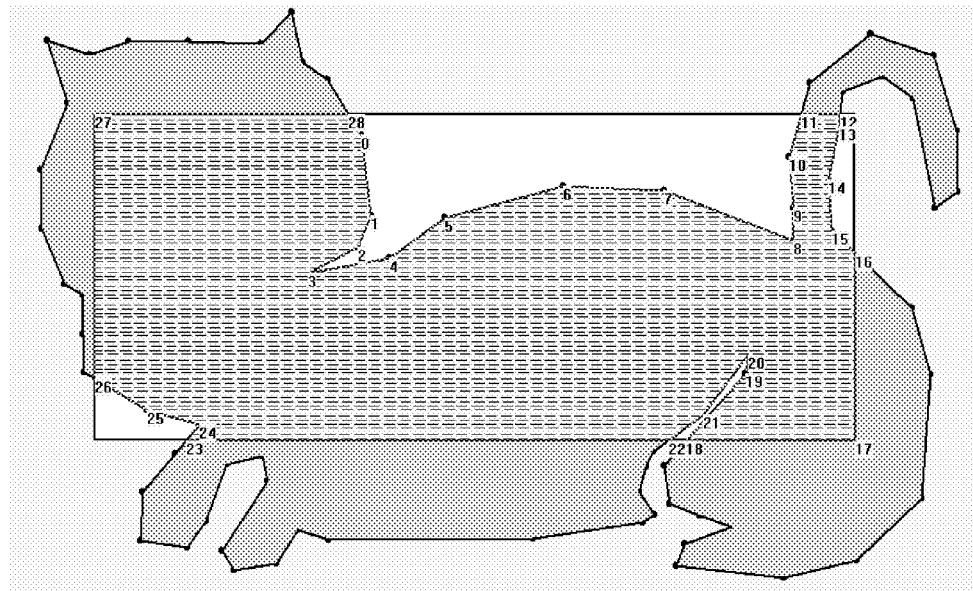
FIG. 6a is a schematic diagram showing an intersection of an arbitrary generic vector map with a rectangular view window according to an embodiment of the present disclosure.

A visual test software is developed based on the algorithm of the present disclosure to test the calculating effect of an overlap region between an arbitrary concave and convex polygon and a rectangle. FIG. 6a shows a calculating effect of an overlap region between a pet contour complex polygon and a rectangle, where the dash-filled part is the calculated overlap region. The clipping method of the present invention enables the clipping of various complex polygons in a rectangular view window.

Figure 6B:
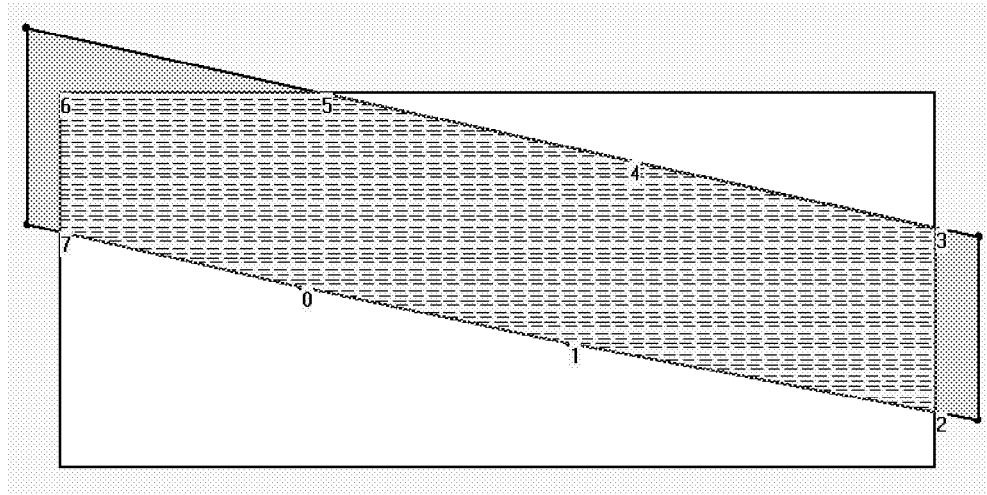
FIGS. 6b-6d are schematic diagrams for processing a visual programming test for petroleum geological primitives, where (6b): a monoclinic stratigraphic model; (6c): an anticlinal stratigraphic model; and (6d): a fault stratigraphic model.
Figure 6C:
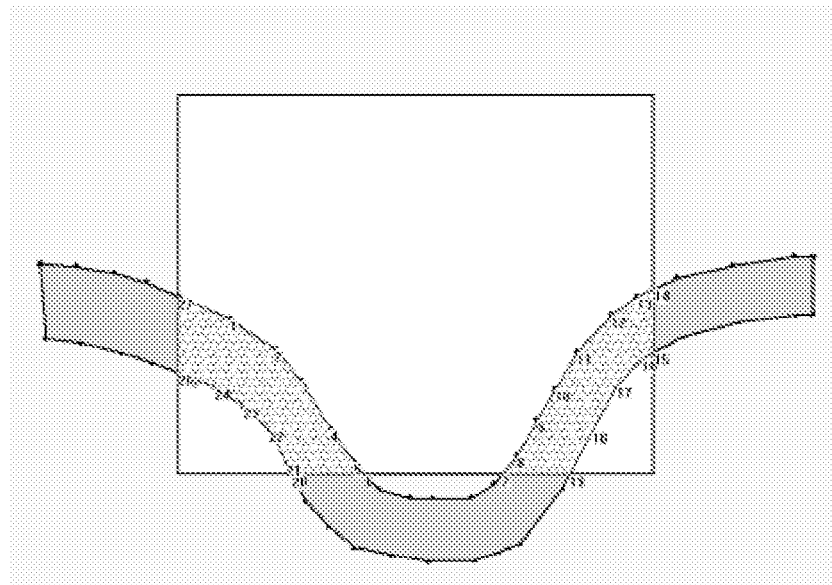
Figure 6D:
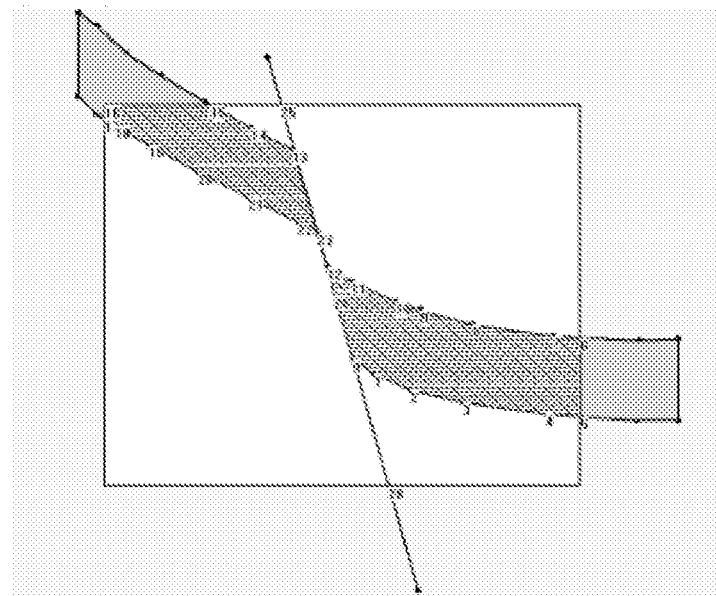
Figure 7:
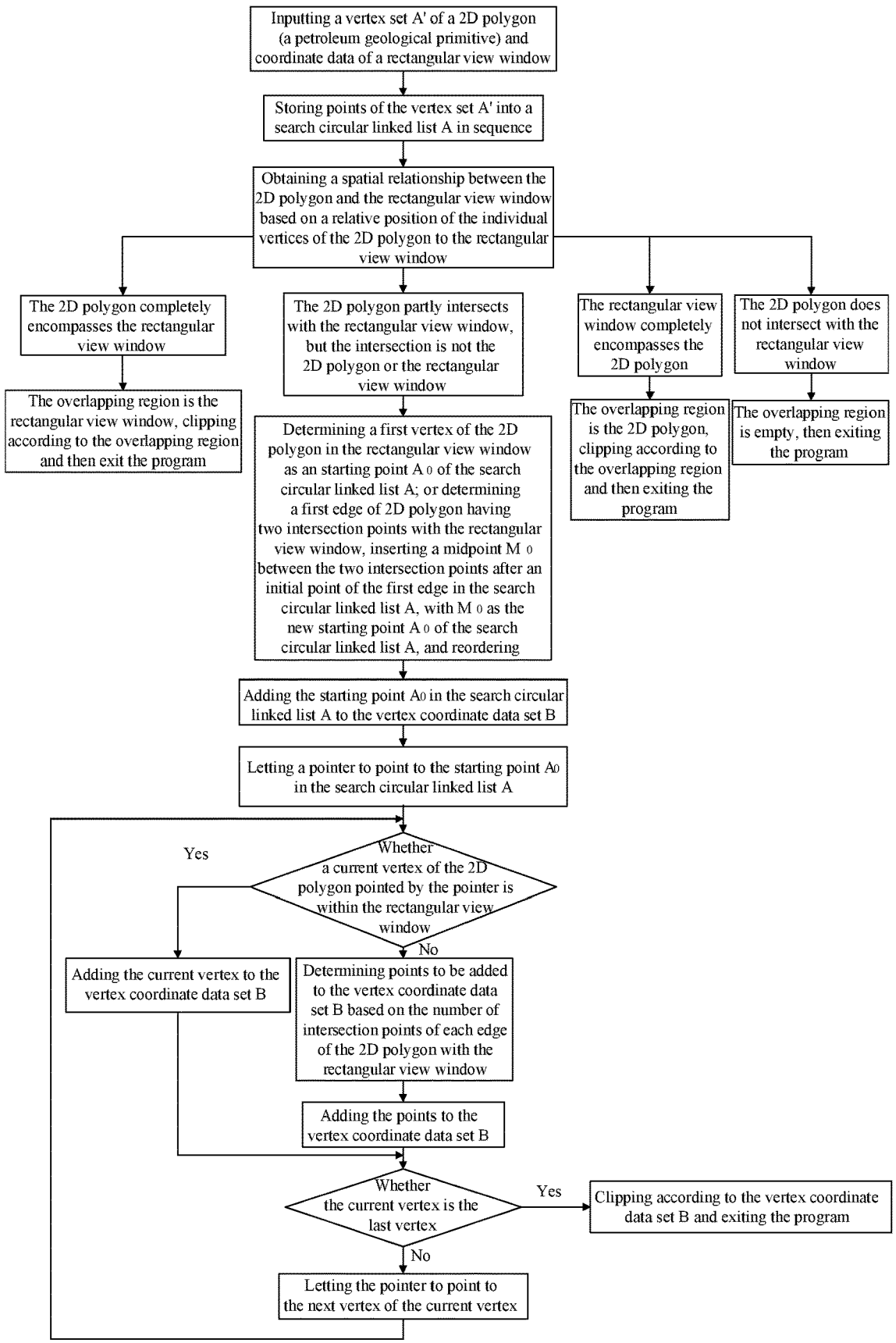
FIG. 7 is a flow chart of the clipping method according to an embodiment of the present disclosure.

FIGS. 6b-6d show the calculating effects of overlap region between petroleum geological primitive vector graphics of monoclinic strata, syncline, and fault with the rectangular view window, respectively. According to the clipping method of the present disclosure, the intersection points between the petroleum geological primitive vector graphic with the rectangular view window are determined and added to the overlap region point set for clipping.

Described above is merely illustrative and is not intended to limit the present disclosure. It should be understood that the present disclosure can be modified and changed by those skilled in the art. All modifications, equivalent replacements, and improvements without departing from the spirits and principles of the present disclosure shall fall within the scope of the present disclosure.

What is claimed is:

1. A method for clipping a two-dimensional (2D) polygon against a rectangular view window, comprising:
   (S1000) inputting a vertex coordinate data set A' of the 2D polygon and coordinate data of the rectangular view window;

TABLE 1

Adding rule for the vertices of the rectangular view window

| Serial number of the edge where the out point $P_1$ is located | Serial number of the edge where the in point $P_2$ is located | Position relationship between the out point $P_1$ and the in point $P_2$ | Serial number of vertices of R in OutPoly | Serial number of the vertices and the adding order thereof |
|---|---|---|---|---|
| 1 | 1 | $P_1$ is on the left of $P_2$ | 1, 2, 3, 4 | 1-4-3-2 |
| 1 | 1 | $P_1$ is on the right of $P_2$ | 1, 2, 3, 4 | 2-3-4-1 |
| 1 | 2 | — | 1, 3, 4 | 1-4-3 |
| 1 | 3 | — | 2, 3 | 2-3 |
| 1 | 3 | — | 1, 4 | 1-4 |
| 1 | 4 | — | 2, 3, 4 | 2-3-4 |
| 2 | 1 | — | 1, 3, 4 | 3-4-1 |
| 2 | 2 | $P_1$ is located above $P_2$ | 1, 2, 3, 4 | 2-1-4-3 |
| 2 | 2 | $P_1$ is located below $P_2$ | 1, 2, 3, 4 | 3-4-1-2 |
| 2 | 3 | — | 1, 2, 4 | 2-1-4 |
| 2 | 4 | — | 3, 4 | 3-4 |
| 2 | 4 | — | 1, 2 | 2-1 |
| 3 | 1 | — | 1, 4 | 4-1 |
| 3 | 1 | — | 2, 3 | 3-2 |
| 3 | 2 | — | 1, 2, 4 | 4-1-2 |
| 3 | 3 | $P_1$ is on the left of $P_2$ | 1, 2, 3, 4 | 4-1-2-3 |
| 3 | 3 | $P_1$ is on the right of $P_2$ | 1, 2, 3, 4 | 3-2-1-4 |
| 3 | 4 | — | 1, 2, 3 | 3-2-1 |
| 4 | 1 | — | 2, 3, 4 | 4-3-2 |
| 4 | 2 | — | 1, 2 | 1-2 |
| 4 | 2 | — | 3, 4 | 4-3 |
| 4 | 3 | — | 1, 2, 3 | 1-2-3 |
| 4 | 4 | $P_1$ is located above $P_2$ | 1, 2, 3, 4 | 1-2-3-4 |
| 4 | 4 | $P_1$ is located below $P_2$ | 1, 2, 3, 4 | 4-3-2-1 |

(S2000) creating a search circular linked list A and a vertex set B of an overlapping region between the 2D polygon and the rectangular view window;

(S3000) numbering individual vertices and edges of the 2D polygon and individual vertices and edges of the rectangular view window; and storing vertices in the vertex coordinate data set A' into the search circular linked list A successively;

(S4000) obtaining a spatial relationship between the 2D polygon and the rectangular view window based on a relative position between individual vertices of the 2D polygon and the rectangular view window; wherein the spatial relationship is expressed by at least spatial relationship 4, the spatial relationships include:

spatial relationship 1: the 2D polygon completely encompasses the rectangular window;

spatial relationship 2: the rectangular view window completely encompasses the 2D polygon;

spatial relationship 3: there is no intersection between the 2D polygon and the rectangular view window; and spatial relationship 4: there is an intersection between the 2D polygon and the rectangular view window, but the intersection is not the 2D polygon or the rectangular view window;

(S5000) if the spatial relationship between the 2D polygon and the rectangular view window is expressed by the spatial relationship 1, performing clipping according to the overlapping region and exiting a clipping program, wherein the overlapping region is the rectangular view window;

if the spatial relationship between the 2D polygon and the rectangular view window is expressed by the spatial relationship 2, performing clipping according to the overlapping region and exiting the clipping program, wherein the overlapping region is the 2D polygon;

if the spatial relationship between the 2D polygon and the rectangular view window is expressed by the spatial relationship 3, the overlapping region is NULL, exiting the clipping program; and if the spatial relationship between the 2D polygon and the rectangular view window is expressed by the spatial relationship 4, taking a first vertex of the 2D polygon in the rectangular view window as a starting point $A_0$ of the search circular linked list A and reordering the vertices of the 2D polygon; and proceeding to step (S6000); or finding a first edge of the 2D polygon having two intersection points with the rectangular view window; inserting a midpoint $M_0$ between the two intersection points into the search circular linked list A after a starting point of the first edge as a new starting point $A_0$ of the search circular linked list A, and reordering the vertices of the 2D polygon; and proceeding to step (S6000);

(S6000) adding the starting point $A_0$ in the search circular linked list A to the vertex set B;

(S7000) allowing a pointer to point to the starting point $A_0$ in the search circular linked list A;

(S8000) determining whether a current vertex of the 2D polygon pointed by the pointer is within the rectangular view window;

if the current vertex is within the rectangular view window, adding the current vertex to the vertex set B;

if the current vertex is outside the rectangular view window, according to the number of intersection points between individual edges of the 2D polygon and the rectangular view window, determining points needed to be added to the vertex set B; and adding the points to the vertex set B; and if the current vertex is not a last vertex, allowing the pointer to point to a next vertex relative to the current vertex, and performing step (S8000); otherwise, proceeding to step (S9000);

wherein the points needed to be added to the vertex set B comprise several vertices of the 2D polygon, intersection points between the 2D polygon and the rectangular view window, several vertices of the rectangular view window, or a combination thereof; and (S9000) clipping the 2D polygon according to the vertex set B and exiting the clipping program;

wherein in step (S8000), the step of "according to the number of intersection points between individual edges of the 2D polygon and the rectangular view window, determining points needed to be added to the vertex set B; and adding the points to the vertex set B" comprises:

(S8100) adding an intersection point $P_1$ to the vertex set B, wherein the intersection point $P_1$ is an intersection point between an edge $A_iA_{i+1}$ and the rectangular view window; $A_{i+1}$ is a first point which is outside the rectangular view window, and $A_i$ is a previous point of $A_{i+1}$; and the intersection point $P_1$ is after the point $A_i$ in the vertex set B;

(S8200) successively selecting two adjacent points $A_{Fd1}$ and $A_{Fd2}$ from the search circular linked list A, wherein the points $A_{Fd1}$ and $A_{Fd2}$ are after the point $A_{i+1}$; and determining the number of intersection points between a segment $A_{Fd1}A_{Fd2}$ and the rectangular view window;

(S8210) if the segment $A_{Fd1}A_{Fd2}$ has no intersection points with the rectangular view window, returning to step (S8200) to select new points from subsequent points in the search circular linked list A for determination;

(S8220) if the segment $A_{Fd1}A_{Fd2}$ has two intersection points with the rectangular view window, adding a midpoint M between the two intersection points to the search circular linked list A; letting the point $A_{Fd2}$ be the midpoint M, such that the segment $A_{Fd1}A_{Fd2}$ has one intersection point $P_2$ with the rectangular view window; and proceeding to step (S8300); and (S8230) if the segment $A_{Fd1}A_{Fd2}$ has one intersection point $P_2$ with the rectangular view window, proceeding to step (S8300);

(S8300) constructing a temporary polygon OutPoly located outside the rectangular view window; with the intersection point $P_1$ as starting point and the point $P_2$ as ending point, adding vertices of the 2D polygon between the point $P_1$ and the point $P_2$ to the OutPoly in sequence;

(S8400) according to serial numbers of edges of the 2D polygon where an out point and an in point are respectively located, and coordinate information of vertices in the OutPoly, inserting several vertices of the rectangular view window at a tail of the vertex set B; and finally adding the point P2;

wherein the vertices of the rectangular view window are inserted at the tail of the vertex set B through steps of:

(S8410) assuming that the point $P_1$ is an intersection point between the edge $A_iA_{i+1}$ and an edge Out- Line of the rectangular view window, and the point $P_2$ is an intersection point between the segment $A_{Fd1}A_{Fd2}$ and an edge InLine of the rectangular view window, such that according to step (S8220), the point $P_1$ is the out point and the point $P_2$ is the in point, and the temporary polygon OutPoly is formed by points $P_1, A_{i+1}, \ldots, A_{Fd1}$, and $P_2$;

(S8420) determining whether individual vertices of the rectangular view window are within the temporary polygon OutPoly; and determining a relationship between an edge on which the out point $P_1$ is located and an edge on which the in point $P_2$ is located;

(S8430) determining the number of vertices of the rectangular view window needed to be added to the vertex set B based on the relationship between the edge on which the out point $P_1$ is located and the edge on which the in point $P_2$ is located;

(S8440) determining an order of adding the vertices of the rectangular view window needed to be added to the vertex set B based on an order of vertices of the rectangular view window passed by a path from the out point $P_1$ to the in point $P_2$ along four edges of the rectangular view window; and (S8450) inserting the vertices of the rectangular view window needed to be added to the vertex set B at the tail of the vertex set B according to the number of the vertices of the rectangular view window needed to be added to the vertex set B and the order of adding the vertices of the rectangular view window needed to be added to the vertex set B; and (S8500) determining whether the point $A_{Fd2}$ is the starting point $A_0$;

if the point $A_{Fd2}$ is the starting point $A_0$, indicating completion of a traversal; and exiting the clipping program;

otherwise, returning to step (S8000) and continuing traversing subsequent vertices of the 2D polygon in the search circular linked list A.

2. The method of claim 1, wherein before the step (S6000), the method further comprises:

(S0001) determining individual edges of the 2D polygon as a vector edge;

(S0002) based on positions of starting and ending points of individual vector edges of the 2D polygon relative to the rectangular view window, determining an intersection point of individual vector edges with the rectangular view window as the out point or the in point;

wherein when a starting point of a vector edge is within the rectangular view window and an ending point of the vector edge is outside the rectangular view window, an intersection point of the vector edge with the rectangular view window is determined as the out point, and an edge of the rectangular view window where the out point is located is recorded as the edge OutLine; and when a starting point of a vector edge is outside the rectangular view window and an ending point of the vector edge is within the rectangular view window, an intersection point of the vector edge with the rectangular view window is determined as the in point, and an edge of the rectangular view window where the in point is located is recorded as the edge InLine.

3. The method of claim 1, wherein in step (S8420), whether individual vertices of the rectangular view window are within the temporary polygon OutPoly is determined through steps of:

(S8421) inputting coordinate data of a vertex P of the rectangular view window and a coordinate point set C of vertices of the temporary polygon OutPoly;

(S8422) obtaining a rectangular region R according to maximum and minimum horizontal and vertical coordinates in the coordinate point set C;

(S8423) determining whether the vertex P is within the rectangular region R;

if not, indicating that the vertex P is outside the temporary polygon OutPoly; and if yes, taking another point P' such that segment PP' is a horizontal segment, and the horizontal coordinate of the point P' is at least 1 greater than the maximum horizontal coordinate in the coordinate point set C; and proceeding to step (S8424);

(S8424) cyclically taking two adjacent points $C_i$ and $C_{i+1}$ in turn from a first point to a last point in the coordinate point set C, with an initial count number of intersections being 0;

determining whether segment $C_iC_{i+1}$ and the segment PP' has an intersection point that is not point $C_i$ or whether there is an overlap between the segment $C_iC_{i+1}$ and the segment PP';

if yes, increasing the count number of intersections by one;

if not, taking next two adjacent points; and when taking the last two adjacent points, if the count number of intersections is odd, the point P is within the temporary polygon OutPoly; and if the count number of intersections is even, the point P is outside the temporary polygon OutPoly.

4. The method of claim 1, wherein step (S8430) comprises:

if the edge OutLine is opposite to the edge InLine, adding two vertices of the rectangular view window to the vertex set B;

if the edge OutLine is adjacent to the edge InLine, adding one or three vertices of the rectangular view window to the vertex set B; and if the edge OutLine and the edge InLine are the same edge, adding zero or four vertices of the rectangular view window to the vertex set B.

5. The method of claim 1, wherein step (S8440) comprises:

leading paths from the out point $P_1$ to the in point $P_2$ along four edges of the rectangular view window;

selecting the path comprising the vertices of the rectangular view window needed to be added to the vertex set B; and determining the order of adding the vertices according to the order in which the path passes through the vertices needed to be added to the vertex set B.

6. The method of claim 1, further comprising:

filling in a vertex addition table of the rectangular view window with the serial numbers of edges where the out point and the in point are respectively located, a position relationship between the out point and the in point when they are on the same edge, a serial number of individual vertices of the rectangular view window in the temporary polygon OutPoly, and the vertices of the rectangular view window needed to be added to the vertex set B and the order of adding the vertices of the rectangular view window, for subsequent direct search and use.

7. The method of claim 1, wherein in step (S4000), the spatial relationship between the 2D polygon and the rectangular view window is obtained through steps of:
   starting from the first vertex of the 2D polygon, successively determining whether individual vertices of the 2D polygon are within the rectangular view window;
   if all vertices of the 2D polygon are within the rectangular view window, the spatial relation is the spatial relationship 2;
   if a next vertex of a vertex is not within the rectangular view window, the spatial relationship is the spatial relationship 4; and
   if all vertices are not within the rectangular view window, determining whether there is an edge having two intersection points with the rectangular view window;
      if yes, the spatial relationship is the spatial relationship 4; and
      if not, determining whether an upper-left vertex of the rectangular view window is within the 2D polygon;
         if yes, the spatial relationship is the spatial relationship 1;
         otherwise, the spatial relationship is the spatial relationship 3.

8. A method for drawing petroleum geological primitives by using the method of claim 1, wherein the petroleum geological primitives comprise polygon-filling primitive data consisting of fold, fault, monocline, sharp extinction, and lithological fill.

9. A method for clipping a two-dimensional (2D) polygon against a rectangular view window, comprising:
   (S1000) inputting a vertex coordinate data set A' of the 2D polygon and coordinate data of the rectangular view window;
   (S2000) creating a search circular linked list A and a vertex set B of an overlapping region between the 2D polygon and the rectangular view window;
   (S3000) numbering individual vertices and edges of the 2D polygon and individual vertices and edges of the rectangular view window; and storing vertices in the vertex coordinate data set A' into the search circular linked list A successively;
   (S4000) obtaining a spatial relationship between the 2D polygon and the rectangular view window based on a relative position between individual vertices of the 2D polygon and the rectangular view window, wherein the spatial relationship is expressed as follows:
   there is an intersection between the 2D polygon and the rectangular view window, but the intersection is not the 2D polygon or the rectangular view window;
   (S5000) taking a first vertex of the 2D polygon in the rectangular view window as a starting point $A_0$ of the search circular linked list A and reordering the vertices of the 2D polygon; and proceeding to step (S6000); or
   finding a first edge of the 2D polygon having two intersection points with the rectangular view window; inserting a midpoint $M_0$ between the two intersection points into the search circular linked list A after a starting point of the first edge as a new starting point $A_0$ of the search circular linked list A, and reordering the vertices of the 2D polygon; and proceeding to step (S6000);
   (S6000) adding the starting point $A_0$ in the search circular linked list A to the vertex set B;
   (S7000) allowing a pointer to point to the starting point $A_0$ in the search circular linked list A;
   (S8000) determining whether a current vertex of the 2D polygon pointed by the pointer is within the rectangular view window;
      if the current vertex is within the rectangular view window, adding the current vertex to the vertex set B;
      if the current vertex is outside the rectangular view window, according to the number of intersection points between individual edges of the 2D polygon and the rectangular view window, determining points needed to be added to the vertex set B; and adding the points to the vertex set B; and
      if the current vertex is not a last vertex, allowing the pointer to point to a next vertex relative to the current vertex, and performing step (S8000); otherwise, proceeding to step (S9000);
      wherein the points needed to be added to the vertex set B comprise several vertices of the 2D polygon, intersection points between the 2D polygon and the rectangular view window, several vertices of the rectangular view window, or a combination thereof; and
   (S9000) clipping the 2D polygon according to the vertex set B and exiting the clipping program;
   wherein in step (S8000), the step of "according to the number of intersection points between individual edges of the 2D polygon and the rectangular view window, determining points needed to be added to the vertex set B; and adding the points to the vertex set B" comprises:
   (S8100) adding an intersection point $P_1$ to the vertex set B, wherein the intersection point $P_1$ is an intersection point between an edge $A_iA_{i+1}$ and the rectangular view window; $A_{i+1}$ is a first point which is outside the rectangular view window, and $A_i$ is a previous point of $A_{i+1}$; and the intersection point $P_1$ is after the point $A_i$ in the vertex set B;
   (S8200) successively selecting two adjacent points $A_{Fd1}$ and $A_{Fd2}$ from the search circular linked list A, wherein the points $A_{Fd1}$ and $A_{Fd2}$ are after the point $A_{i+1}$; and determining the number of intersection points between a segment $A_{FD1}A_{Fd2}$ and the rectangular view window;
      (S8210) if the segment $A_{Fd1}A_{Fd2}$ has no intersection points with the rectangular view window, returning to step (S8200) to select new points from subsequent points in the search circular linked list A for determination;
      (S8220) if the segment $A_{Fd1}A_{Fd2}$ has two intersection points with the rectangular view window, adding a midpoint M between the two intersection points to the search circular linked list A; letting the point $A_{Fd2}$ be the midpoint M, such that the segment $A_{Fd1}A_{Fd2}$ has one intersection point $P_2$ with the rectangular view window; and proceeding to step (S8300); and
      (S8230) if the segment $A_{Fd1}A_{Fd2}$ has one intersection point $P_2$ with the rectangular view window, proceeding to step (S8300);
   (S8300) constructing a temporary polygon OutPoly located outside the rectangular view window; with the intersection point $P_1$ as starting point and the point $P_2$ as ending point, adding vertices of the 2D polygon between the point $P_1$ and the point $P_2$ to the OutPoly in sequence;

(S8400) according to serial numbers of edges of the 2D polygon where an out point and an in point are respectively located, and coordinate information of vertices in the OutPoly, inserting several vertices of the rectangular view window at a tail of the vertex set B; and finally adding the point $P_2$;

wherein the vertices of the rectangular view window are inserted at the tail of the vertex set B through steps of:

(S8410) assuming that the point $P_1$ is an intersection point between the edge $A_iA_{i+1}$ and an edge OutLine of the rectangular view window, and the point $P_2$ is an intersection point between the segment $A_{Fd1}A_{Fd2}$ and an edge InLine of the rectangular view window, such that according to step (S8220), the point $P_1$ is the out point and the point $P_2$ is the in point, and the temporary polygon OutPoly is formed by points $P_1, A_{i+1}, \ldots, A_{Fd1}$, and P2;

(S8420) determining whether individual vertices of the rectangular view window are within the temporary polygon OutPoly; and determining a relationship between an edge on which the out point $P_1$ is located and an edge on which the in point $P_2$ is located;

(S8430) determining the number of vertices of the rectangular view window needed to be added to the vertex set B based on the relationship between the edge on which the out point $P_1$ is located and the edge on which the in point $P_2$ is located;

(S8440) determining an order of adding the vertices of the rectangular view window needed to be added to the vertex set B based on an order of vertices of the rectangular view window passed by a path from the out point $P_1$ to the in point $P_2$ along four edges of the rectangular view window; and (S8450) inserting the vertices of the rectangular view window needed to be added to the vertex set B at the tail of the vertex set B according to the number of the vertices of the rectangular view window needed to be added to the vertex set B and the order of adding the vertices of the rectangular view window needed to be added to the vertex set B; and (S8500) determining whether the point $A_{Fd2}$ is the starting point $A_0$;

if the point $A_{Fd2}$ is the starting point $A_0$, indicating completion of a traversal; and exiting the clipping program;

otherwise, returning to step (S8000) and continuing traversing subsequent vertices of the 2D polygon in the search circular linked list A.

* * * * *